US007008717B2

(12) United States Patent
Yang

(10) Patent No.: US 7,008,717 B2
(45) Date of Patent: Mar. 7, 2006

(54) DIAPHRAGM PUMP AND ANODE STREAM RECIRCULATION SYSTEM USING SUCH PUMP FOR A FUEL CELL

(75) Inventor: Jefferson YS Yang, Orange, CA (US)

(73) Assignee: Asia Pacific Fuel Cell Technologies, Inc., Taipei (TW)

(*) Notice: Subject to any disclaimer, the term of this patent is extended or adjusted under 35 U.S.C. 154(b) by 184 days.

(21) Appl. No.: 10/776,197

(22) Filed: Feb. 12, 2004

(65) Prior Publication Data

US 2004/0161350 A1 Aug. 19, 2004

Related U.S. Application Data

(62) Division of application No. 09/972,606, filed on Oct. 5, 2001, now Pat. No. 6,846,587.

(30) Foreign Application Priority Data

Aug. 15, 2001 (TW) .............................. 90120011 A

(51) Int. Cl.
*H01M 2/08* (2006.01)

(52) U.S. Cl. ........................... 429/35; 429/34; 429/25; 429/19

(58) Field of Classification Search ................ 204/265, 204/266, 257, 263, 258; 429/19, 25, 34, 429/35
See application file for complete search history.

(56) References Cited

U.S. PATENT DOCUMENTS 5,855,761 A * 1/1999 Joshi .......................... 205/615
5,951,538 A * 9/1999 Joshi et al. ................. 604/500
6,491,684 B1 * 12/2002 Joshi et al. .............. 604/892.1

* cited by examiner

*Primary Examiner*—Bruce F. Bell
(74) *Attorney, Agent, or Firm*—Rosenberg, Klein & Lee

(57) ABSTRACT

An anode stream recirculation system for a fuel cell, the fuel cell including an anode gas input and an anode gas output, the anode stream recirculation system comprising: an anode gas supply; a switch connected with the anode gas supply; a pressure regulating device connected between the switch and the anode gas input of the fuel cell; a diaphragm pump connected between the anode gas output and the anode gas input of the fuel cell thereby forming an anode gas recirculation; wherein the diaphragm pump has at least a sensor electrically connected with the switch.

5 Claims, 5 Drawing Sheets

DIAPHRAGM PUMP AND ANODE STREAM RECIRCULATION SYSTEM USING SUCH PUMP FOR A FUEL CELL

CROSS-REFERENCES TO RELATED APPLICATIONS

This application is a division of application No. 09/972,606 filed Oct. 5, 2001, now U.S. Pat. No. 6,846,587.

STATEMENT REGARDING FEDERALLY SPONSORED RESEARCH OR DEVELOPMENT

Not Applicable

BACKGROUND OF THE INVENTION

1. Field of the Invention

This invention is related to a diaphragm pump and an anode stream recirculation system using such pump for a fuel cell, in particular, an anode stream recirculation system used in a proton exchange membrane fuel cell as well as the diaphragm pump used in such system, and most particularly, a hydrogen recirculation system and the diaphragm pump utilized in a proton exchange membrane fuel cell. The present invention eliminates certain elements required in the conventional anode stream recirculation system for a fuel cell and, thus reduces the cost for manufacture of the components of the fuel cell. Furthermore, this invention lowers the electrical energy required to operate—the anode stream recirculation system so that the overall efficiency of electrical power generation for the fuel cell system can be promoted.

2. Description of the Related Art

With the rapid growth of civilization, the consumption of traditional energy resources, such as coal, oil and natural gas, increases rapidly. This results in serious environmental pollution and causes a series of environmental problems such as global warming and acid rain. It is now recognized that the existing natural energy resources are limited. Therefore, if the present rate of energy consumption continues, all existing natural energy resources will be exhausted in the near future. Accordingly, many developed countries are conducting research and development of new and alternative energy resources. The fuel cell is one of the most important and reasonably priced energy resources. Compared with traditional internal combustion engines, the fuel cell has many advantages such as high energy conversion efficiency, clean exhaust, low noise, and no consumption of traditional gasoline.

In brief, a fuel cell is an electrical power generation device powered by the electrochemical reaction of hydrogen and oxygen. Basically, the reaction is a reverse reaction of the electrolysis of water, to convert the chemical energy into electrical energy. The basic structure of a fuel cell, for example, a proton exchange membrane fuel cell, comprises a plurality of cell units. The structure of the cell unit generally illustrated in FIG. 1 comprises a proton exchange membrane (PEM) 10 at the middle, with the two sides thereof provided with a layer of catalyst 12, each of the two outsides of the catalyst 12 is further provided with a gas diffusion layer (GDL) 14. An anode plate 16 and a cathode plate 18 are further provided at the outermost sides adjacent to the GDL 14. After tightly combining all the above elements together, a cell unit is formed. For practical application of the fuel cell, a plurality of the above cell units are stacked and serially connected to provide sufficient power, as illustrated in FIG. 2. Therefore, two adjacent cell units can share a common polar plate 20, as illustrated in FIG. 3, which serves as the anode and the cathode for the two adjacent cell units, respectively. Accordingly, such a polar plate 20 is usually referred as a bipolar plate. Generally, as illustrated in FIG. 3, the two sides of the bipolar plate 20 are provided with many groove type gas channels 22 for transporting the gases for reaction, such as hydrogen and air (to provide oxygen), as well as transporting the reactants, such as water droplets or vapor, out of the bipolar plate 20.

One conventional gas supply system for use in a fuel cell comprises: a cathode gas supply system (such as an oxygen supply), and an anode circulation system (such as a hydrogen circulation system), as illustrated in FIG. 4. Atmospheric air may serve as a supply of the oxygen supply system 30, where air is filtered by a filter 32 and than pumped into the fuel cell 50 through a blower 34. Excessive air, upon reaction within the fuel cell 50, is discharged through a water recuperator 36. The water recuperator 36 may recuperate the minute amount of water contained within the discharged air, where the water is then directed to a cooling system 38. The useless heat generated by the fuel cell 50 is also transmitted to the cooling system 38. The coolant used in the cooling system 38 then re-enters the fuel cell 50 to provide sufficient cooling thereto.

The conventional anode circulation system includes: a hydrogen source 40 which regulates hydrogen input through a pressure regulator 42; a hydrogen pump 44 being provided at the other end of the fuel cell 50 for discharging excessive hydrogen, upon reaction within the fuel cell, and for pumping the hydrogen source 40 into the fuel cell 50. The excessive hydrogen is discharged through a humidifier 46, such as a bubbler, for increasing the humidity of the excessive hydrogen, then flows back into the piping of the hydrogen supply to be mixed with fresh hydrogen, and then repeats the same circulation. The water within the cooling system 38 can be transmitted to the water within the humidifier 46

The hydrogen within the bipolar plate of the fuel cell must have adequate humidity such that the hydrogen ions ($H^+$) after reaction can be carried through the PEM by the water vapor. The hydrogen ions then react with the oxygen at the other side of the PEM and the electrons provided from the outer circuit, to establish proton conduction. Generally, if the humidity of the hydrogen is too low, the PEM will be dehydrated, thus, the electrical resistance of the fuel cell will increase and the voltage of the fuel cell will decrease, which will result in the working life of the fuel cell being significantly shortened. If, on the other hand, the humidity of the hydrogen is too high, the channels for transporting the gases within the bipolar plate may be clogged by water droplets, which will stop the reaction of gases within the fuel cell and the performance of the fuel cell will be seriously impaired. Accordingly, in the anode stream recirculation system, a humidifier to adjust the humidity of the hydrogen is generally required.

BRIEF SUMMARY OF THE INVENTION

A primary objective of this invention is to improve the conventional anode stream recirculation system by utilizing a diaphragm pump for continuously collecting the excessive hydrogen discharged from the fuel cell, and then directing the collected hydrogen back into the fuel cell for reaction. Therefore, the conventional hydrogen pump may be eliminated, the parasitic loss of electrical energy of the fuel cell itself can be reduced, and the overall efficiency of electrical power generation by the fuel cell system can be promoted.

Another objective of this invention is that the anode stream recirculation system and the diaphragm pump can be further connected with a water circulation system. As a result, the water in the water circulation system can be driven by the diaphragm pump simultaneously. Therefore, the driving pump necessary for conventional water circulation system of the fuel cell may also be eliminated and thus, the parasitic loss of electrical energy of the fuel cell can be further reduced and the overall efficiency of electrical power generation by the fuel cell system is further promoted by this invention.

A further objective of this invention is to automatically clear out the gas channels of the bipolar plates within the fuel cell by the pressure pulses introduced from intermittently switching on/off the hydrogen source so that no water droplet will stay within the gas channels to impair the power generation efficiency of the fuel cell.

The primary technical contents of this invention are related to an anode stream recirculation system for a fuel cell, the fuel cell including an anode gas input and an anode gas output, the anode stream recirculation system comprising: an anode gas supply; a switch connected with the anode gas supply; a pressure regulating device connected between the switch and the anode gas input of the fuel cell; a diaphragm pump connected between the anode gas output and the anode gas input of the fuel cell thereby forming an anode gas recirculation; wherein the diaphragm pump has at least a sensor electrically connected with the switch.

Another important feature of this invention is the diaphragm pump utilized in the anode stream recirculation system for the fuel cell. The diaphragm pump has a wall defining an interior space, a piston provided in the interior space, and a diaphragm assembly sealing with the piston and the wall of the diaphragm pump thereby dividing the interior space into two portions.

The structures and characteristics of this invention can be realized by referring to the appended drawings and explanations of the preferred embodiments.

DETAILED DESCRIPTION OF THE INVENTION

Figure 1:
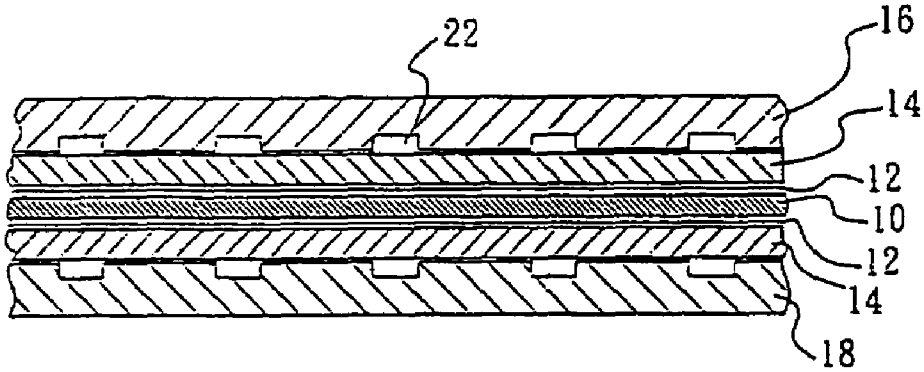
FIG. 1 is a schematic cross sectional view showing the structure of a cell unit of a conventional fuel cell.
Figure 2:
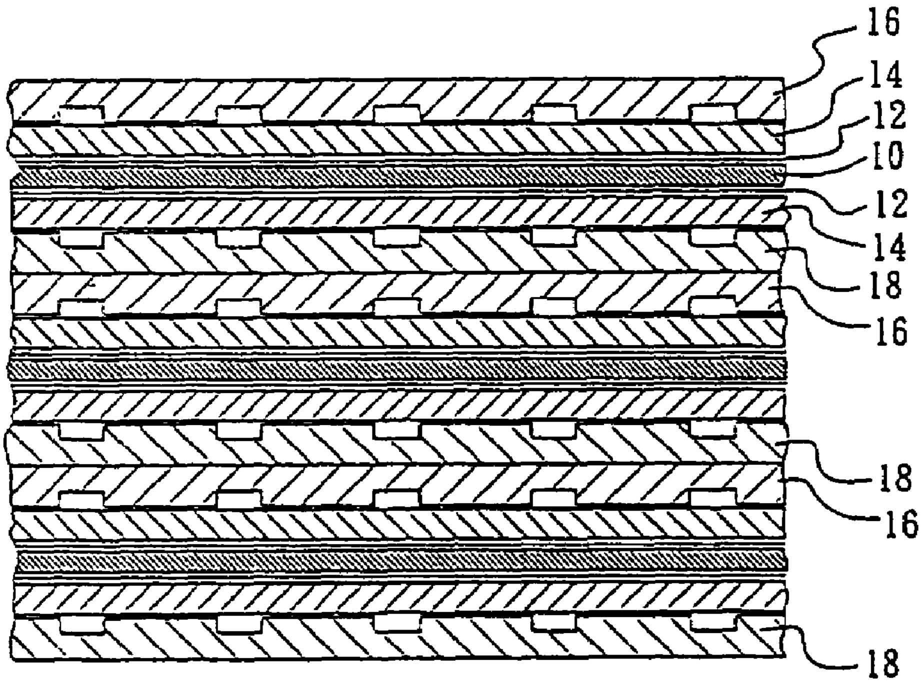
FIG. 2 is a schematic cross sectional view showing the structure of combining a plurality of the conventional cell units.
Figure 3:
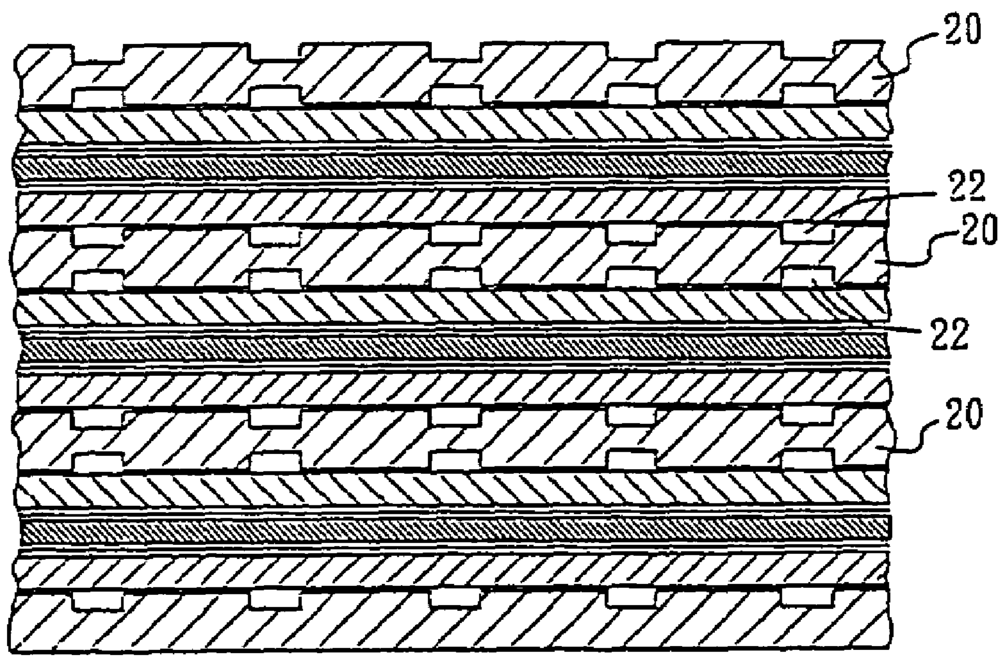
FIG. 3 is a schematic cross sectional view showing a portion of the conventional fuel cell.
Figure 4:
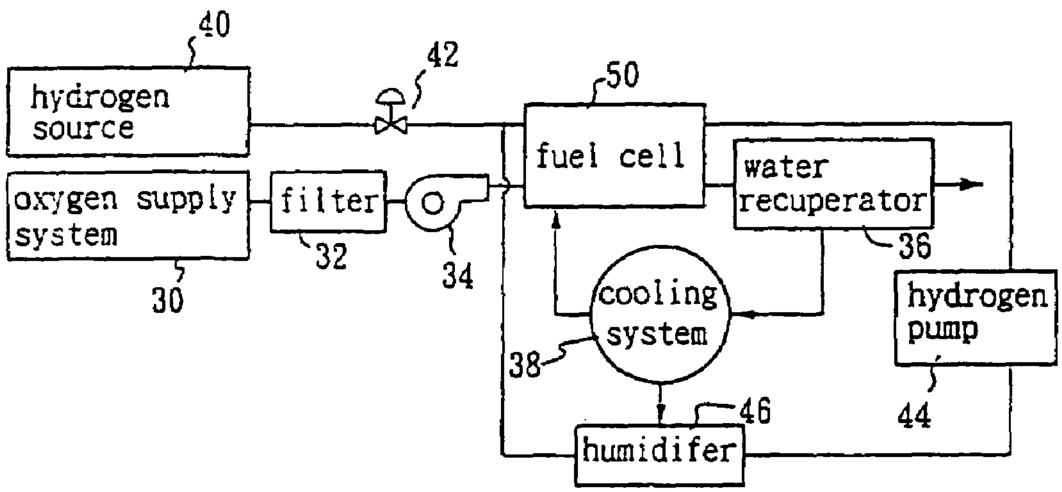
FIG. 4 is a schematic view showing a gas supply of a conventional fuel cell.
Figure 5:
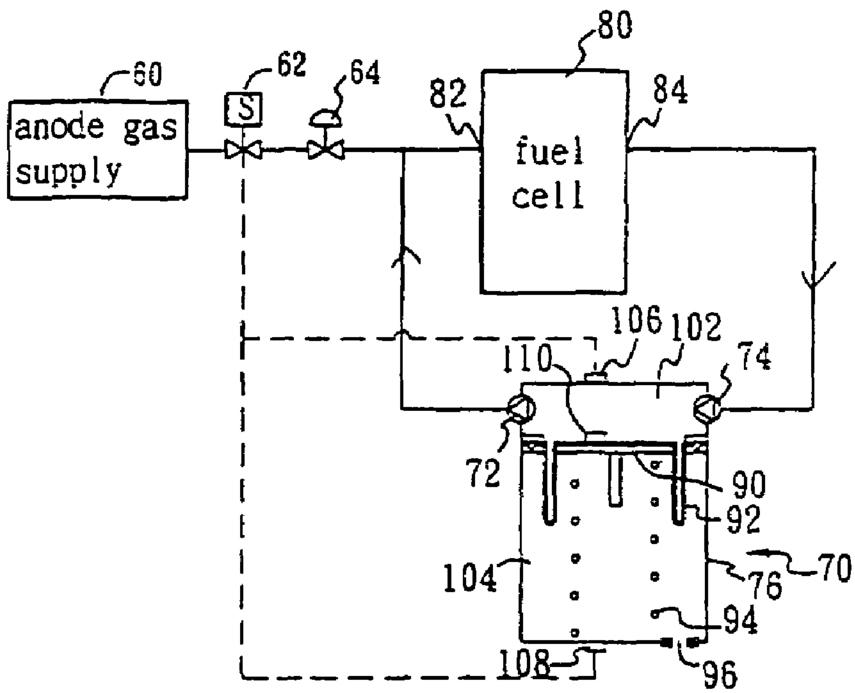
FIG. 5 is a schematic view showing a preferred embodiment of an anode gas recirculation system of this invention.

This invention is related to an anode stream recirculation system for a fuel cell, in particular, a hydrogen recirculation system utilized in a proton exchange membrane (PEM) fuel cell. One preferred embodiment of this invention is substantially shown in FIG. 5, which includes an anode gas supply 60 to provide the anode gas required for the reaction proceeded in the fuel cell 80. For the present embodiment of the proton exchange membrane fuel cell, the anode gas is hydrogen. The anode gas flows through a switch 62 and a pressure regulating device 64 before entering the fuel cell 80 through an anode gas input 82. The switch 62 can be a solenoid valve which is used to control the open/close of the gas flow in the piping and to determine whether fresh anode gas should be released from the anode gas supply 60. The pressure regulating device 64 is used to adjust the pressure of the anode gas flowing therethrough. Generally, the flowing amount of the anode gas is set to be higher than the required Stoichiometric amount for a specific electrical power generation of the fuel cell so as to ensure that the electrochemical reaction takes place completely within the fuel cell 80. The fuel cell 80 also has an anode gas output 84. The anode stream recirculation system further comprises a diaphragm pump 70 connected with both the anode gas output 84 and the anode gas input 82 of the fuel cell 80 thereby forming an anode gas recirculation as illustrated in FIG. 5. The anode stream recirculation system further comprises two check valves 72 and 74 with one provided between the anode gas input 82 of the fuel cell 80 and the diaphragm pump 70, and the other provided between the anode gas output 84 of the fuel cell 80 and the diaphragm pump 70. In this preferred embodiment, the check valves 72 and 74 are mounted on the two sides of the diaphragm pump 70.

Figure 6:
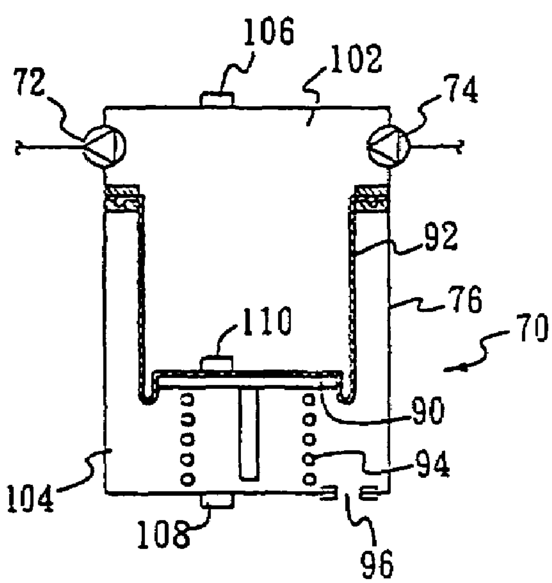
FIG. 6 is a schematic cross sectional view showing the diaphragm pump of this invention.

According to the preferred embodiment of this invention, the diaphragm pump 70 has a wall 76 defining an interior space and a piston 90 is provided in the interior space. A diaphragm 92 is attached over the piston 90 and is sealing with the wall 76 of the diaphragm pump 70. The diaphragm 92 can be made of rubber and divides the interior space into two portions 102 and 104. The wall 76 of the diaphragm pump 70 further comprises an opening 96 for atmosphere. Thus, the portion 102 of the interior space is adjoined with the anode stream recirculation system, and the other portion 104 of the interior space is communicated with atmosphere. Furthermore, the piston 90 lies on an elastic device, such as a spring 94. In the preferred embodiment, such as that shown in FIGS. 5 and 6, the diaphragm pump 70 has two Hall effect sensors 106 and 108 mounted on the top side and bottom side of the diaphragm pump 70, respectively. The Hall effect sensor may be model No. HAL504UA-E produced by Micronas Company, or model No. DN6848-ND produced by Panasonic Company, or any other types of sensors that can perform a similar function as described below. A magnetic member, such as a magnet 110, is mounted on the piston 90. The piston 90 can move up and down, depending on variation of the pressure of the portions 102 and 104 on the two sides of the diaphragm 92, as well as the elastic force provided by the spring 94.

In this preferred embodiment, the two sensors 106 and 108 sense the position of the piston 90 by the magnet 110 thereon. The flowing rate and the pressure of the anode gas supply 60 are set to be higher than the required Stoichiometric amount for a specific electrical power generation of the fuel cell 80 so as to ensure that the electrochemical reaction takes place completely within the fuel cell 80. Accordingly, excessive anode gas will be discharged into the output piping and be collected in the portion 102 of the diaphragm pump 70 through the anode gas output 84. As the other portion 104 of the diaphragm pump 70 is communicated with the atmosphere by the opening 96, the pressure of the portion 104 remains at a constant atmospheric pressure. When the switch 62 is switched on, the anode gas from the anode gas supply 60 with significantly higher pressure will thrust into the whole system, the pressure of the portion 102 thus increases and thereby moves the piston 90 downwardly and compresses the spring 94. When the piston 90 downwardly moves to a predetermined position, the sensor 108 senses the position of the approaching magnet 110 on the piston 90 and transmits a signal to switch off the switch 62. At this time, no more fresh anode gas is supplied. As the electrochemical reaction within the fuel cell 80 proceeds, the anode gas will be consumed and the pressure in the system decreases. Therefore, the piston 90 is forced upwardly by the elastic force of the spring 94 and the atmospheric pressure to further expel the anode gas stored in the portion 102 into the fuel cell 80. As the electrochemical reaction within the fuel cell 80 continues, the anode gas within the portion 102 will be consumed progressively, and the excessive anode gas discharged from the fuel cell 80 keeps decreasing. Accordingly, the pressure in the portion 102 keeps decreasing and the pump 90 keeps moving upwardly. When the piston 90 upwardly moves to another predetermined position, the sensor 106 senses the approaching magnet 110 on the piston 90 and thus, transmits another signal to switch on the switch 62. As a result, fresh anode gas is again supplied from the anode gas supply 60 and thrusts into the whole system, and the piston 90 is therefore compressed downwardly.

By the above design, the anode recirculation system of this invention can recycle excessive anode gas that has not been reacted, and automatically redirect this gas back into the fuel cell for reaction. Thus, the hydrogen pump 44 required in the conventional technique for gas recirculation is utterly unnecessary. This invention therefore reduces the parasitic loss of electrical energy of the fuel cell itself. For this preferred embodiment, about 5% of the generated electrical power from the fuel cell can be saved and thus, the overall efficiency of electrical power generation by the fuel cell system is promoted.

Figure 7:
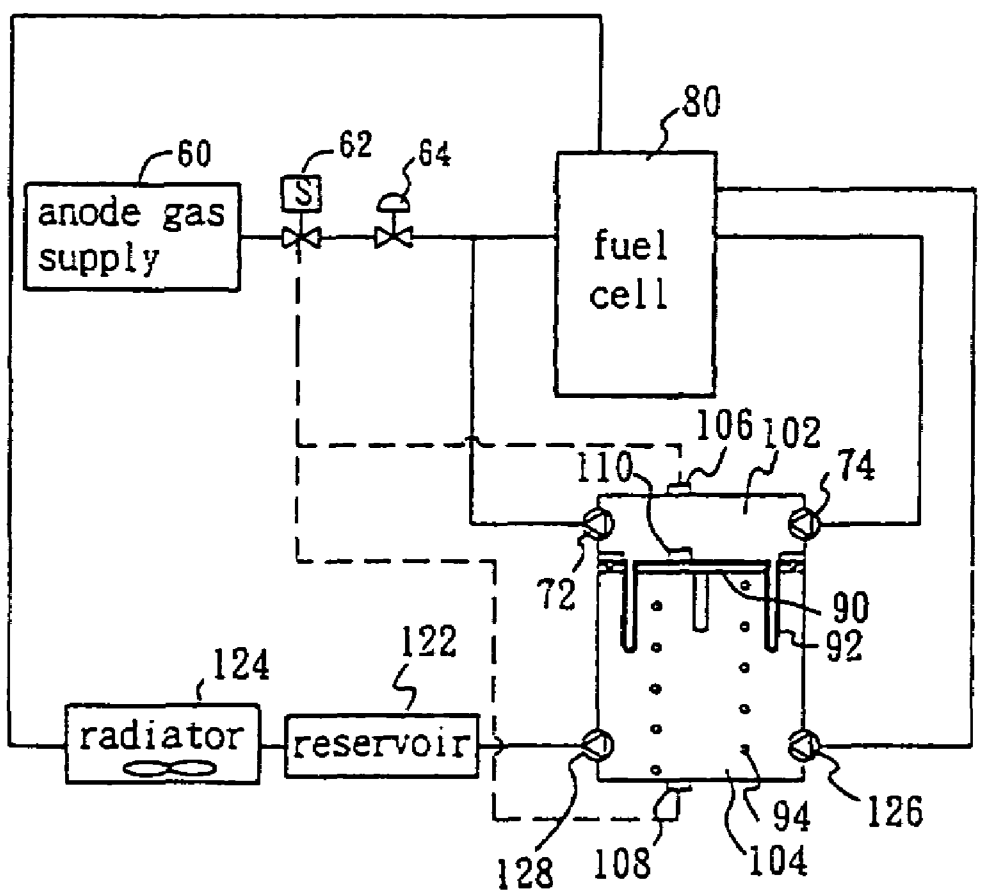
FIG. 7 schematically illustrates the anode gas recirculation system and the diaphragm pump being further connected with a water circulation system according to a preferred embodiment of this invention.

According to another preferred embodiment of this invention, as shown in FIG. 7, the diaphragm pump 70 may not be communicated with atmosphere, instead, it is communicated with a water circulation system. The water circulation system further comprises a reservoir 122 to contain the circulation water and a radiator 124 to lower the water temperature. The circulation water may also be directed to the fuel cell 80 to cool it. The water circulation system is connected with the diaphragm pump 70 through check valves 126 and 128 for input and output of the circulation water. Thus, the portion 104 of the diaphragm pump 70 is now filled with water instead of air. When the piston 90 of the diaphragm pump 70 moves up and down according to the same manner described above, the water is driven and circulated within the water circulation system simultaneously. Therefore, the driving pump necessary for conventional water circulation system of the fuel cell 80 may also be eliminated and thus, the parasitic loss of electrical energy of the fuel cell can be further reduced and the overall efficiency of electrical power generation by the fuel cell system is further promoted by this invention.

The diaphragm pump according to this invention involves simple construction with low manufacture costs, and it does not need to consume any energy during operation. In addition, every time the switch 62 is switched on, the anode gas with significantly higher pressure will thrust into the whole system, especially into the fuel cell 80. As a result, any water droplet condensed from the reaction of the fuel cell 80 or any undesired particle existing within the gas channels 22 of the bipolar plate 20 will be shattered and/or expelled out of the gas channels 22 by such intermittent high-pressure thrust gas. Thus, this invention also provides a function of intermittently and automatically clearing out the gas channels within the fuel cell.

This invention is related to a novel creation that makes a breakthrough to conventional art. Aforementioned explanations, however, are directed to the description of preferred embodiments according to this invention. Various changes and implementations can be made by persons skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

What is claimed is:

1. A diaphragm pump for a fuel cell, the diaphragm pump is used in an anode stream recirculation system for the fuel cell, the diaphragm pump comprising a wall defining an interior space, a piston provided in the interior space, and a diaphragm assembly sealing with the piston and the wall of the diaphragm pump thereby dividing the interior space into two portions, an inlet and outlet opening on one side of the piston, and an atmosphere opening on the opposite side of the piston, which opening enables entry and exit of atmosphere from the interior space.

2. The diaphragm pump according to claim 1, wherein the diaphragm assembly comprises a diaphragm made of rubber.

3. A diaphragm pump for a fuel cell, the diaphragm pump is used in an anode stream recirculation system for a fuel cell, the diaphragm pump comprising a wall defining an interior space, a piston provided in the interior space, and a diaphragm assembly sealing with the piston and the wall of the diaphragm pump thereby dividing the interior space into two portions; and an elastic device resisting against a bottom of the piston to provide an upward force to the piston; the piston is adapted to move between a first position and a second position depending on variation of pressure on two sides of the diaphragm assembly and the force provided by the elastic device.

4. A diaphragm pump for a fuel cell, the diaphragm pump is used in an anode stream recirculation system for the fuel cell, the diaphragm pump comprising a wall defining an interior space, a piston provided in the interior space, and a diaphragm assembly sealing with the piston and the wall of the diaphragm pump thereby dividing the interior space into two portions; and at least one sensor to sense the piston.

5. The diaphragm pump according to claim 4, wherein the diaphragm pump comprises two Hall effect sensors with one disposed at an upper side and the other disposed at a lower side of the diaphragm pump, and a magnetic member disposed on the piston to interact with the Hall effect sensors.

* * * * *